United States Patent
Flannery

(10) Patent No.: US 6,412,074 B1
(45) Date of Patent: Jun. 25, 2002

(54) COMPUTER POWER DOWN UPON EMERGENCY NETWORK NOTIFICATION

(75) Inventor: Michael R. Flannery, Sioux City, IA (US)

(73) Assignee: Gateway, Inc., Poway, CA (US)

(*) Notice: Subject to any disclaimer, the term of this patent is extended or adjusted under 35 U.S.C. 154(b) by 0 days.

(21) Appl. No.: 09/943,862

(22) Filed: Aug. 31, 2001

Related U.S. Application Data

(63) Continuation of application No. 08/902,812, filed on Jul. 3, 1997, now Pat. No. 6,286,106.

(51) Int. Cl.[7] .............................. G06F 1/26; G06F 1/28; G06F 1/30
(52) U.S. Cl. ...................... 713/310; 713/300; 709/217; 709/218; 709/219; 710/19
(58) Field of Search ................. 713/300–340, 713/1; 709/217, 218, 219; 710/19

(56) References Cited

U.S. PATENT DOCUMENTS

| | | | |
|---|---|---|---|
| 5,140,419 A | 8/1992 | Galumbeck et al. ........ 358/142 |
| 5,160,853 A | 11/1992 | Simon et al. ............... 307/140 |
| 5,265,024 A | 11/1993 | Crabill et al. .............. 364/443 |
| 5,379,215 A | 1/1995 | Kruhoeffer et al. ......... 364/420 |
| 5,444,433 A | 8/1995 | Gropper ..................... 340/601 |
| 5,444,611 A | 8/1995 | Woytowitz et al. ......... 364/145 |
| 5,467,271 A | 11/1995 | Abel et al. .................. 364/420 |
| 5,473,309 A | 12/1995 | Marcum ..................... 340/514 |
| 5,479,338 A | 12/1995 | Ericksen et al. ............ 364/145 |
| 5,479,339 A | 12/1995 | Miller ........................ 364/145 |
| 5,491,629 A | 2/1996 | Fox et al. ................... 364/420 |
| 5,517,193 A | 5/1996 | Allison et al. ............... 342/26 |
| 5,557,739 A | 9/1996 | Gupta et al. .............. 395/183.1 |
| 5,657,003 A | * 8/1997 | Fuentes ...................... 340/690 |
| 5,848,378 A | * 12/1998 | Shelton et al. ................. 702/3 |
| 5,864,683 A | 1/1999 | Boebert et al. ......... 395/200.79 |
| 5,870,610 A | 2/1999 | Beyda ......................... 395/712 |
| 6,020,657 A | * 2/2000 | Liran .......................... 307/64 |
| 6,041,242 A | * 3/2000 | Coulthard ................... 455/575 |
| 6,169,476 B1 | * 1/2001 | Flanagan ............... 340/286.02 |
| 6,204,572 B1 | * 3/2001 | Liran .......................... 307/64 |

OTHER PUBLICATIONS

"Advanced Power Management (APM)—BIOS Interface Specification, Revision 1.2", APM Specification from Intel Corporation and Microsoft Corporation, i–v, 1–75, (Feb. 1996).

* cited by examiner

*Primary Examiner*—Rupal Dharia
(74) *Attorney, Agent, or Firm*—Mark S. Walker; Rodney L. Lacy; Schwegman, Lundberg, Woessner & Kluth

(57) ABSTRACT

A computer having an emergency protection program is disclosed. The emergency protection program turns off the computer in response to receiving a notification of an impending potential local emergency. In one embodiment, the program receives the notification from an external network site over an external network connection. In one embodiment, the program waits a predetermined amount of time prior to shutting down the computer, and also is responsive to an abort-shut down input to not shut down the computer, or an immediate-shut down input to immediately shut down the computer.

21 Claims, 3 Drawing Sheets

COMPUTER POWER DOWN UPON EMERGENCY NETWORK NOTIFICATION

RELATED APPLICATION

This application is a continuation of U.S. Ser. No. 08/902,812, filed Jul. 3, 1997, is now U.S. Pat. No. 6,286,106 which application is made a part hereof bay reference.

FIELD OF THE INVENTION

This invention relates generally to the powering down of a computer system, and in particular to the powering down of a computer system incident to reception of an emergency notification over a network.

BACKGROUND OF THE INVENTION

As the usage of computers has pervaded almost every aspect of life in modern-day society, the importance that they do not become damaged in the case of an emergency such as severe weather, flooding, or a tornado has correspondingly increased. Besides the replacement of a vast investment of computer equipment that may be required if the equipment is damaged in such an emergency, the delay in getting the equipment back online can be costly for businesses, municipalities, and even homes. Therefore, when a potential emergency condition is impending, the prudent course of action is to turn off the computer equipment until the emergency situation has passed.

Current technology reacts to actual emergency conditions, which may provide insufficient time to prevent damage to computer equipment. For example, surge suppression systems that turn power off to a system when a power surge of a sufficient magnitude is detected do not allow for a controlled shut down. Because the power surge is an immediate threat to the computer equipment, there is not sufficient time to warn an operator of the equipment of the emergency, nor is there sufficient time to initiate a controlled shut down sequence that may involve the backing up of data, etc. Data loss may thus result in the case of shut down by a surge suppression system.

There is a need, therefore, for the powering down of a computer incident to reception of an impending potential emergency condition that overcomes these shortcomings. There is a need for such reception that provides sufficient time to provide for the controlled shut down of the computer equipment which is in danger of damage due to the emergency condition. That is, there is a need for sufficient time to permit the backing up of critical data prior to shut down, after reception of an impending potential emergency condition.

SUMMARY OF THE INVENTION

The above-mentioned shortcomings and needs are addressed by the present invention, which will be understood by reading and studying the following specification. The present invention describes a computer having an emergency protection program. The program receives a notification of an impending potential local emergency from an external network site, and turns off the computer in response. Because the program turns off the computer in response to the notification of an impending potential local emergency condition, as opposed to a local emergency condition currently happening, the invention provides sufficient time to properly turn off the computer. That is, the invention provides sufficient time to back up data before the computer is shut down.

Other embodiments include a method according to the present invention, as well as a computer-readable media having a program stored thereon to cause a suitably equipped computer to execute a computer program, also according to the invention. In a preferred embodiment, the impending potential local emergency comprises an impending potential local weather emergency, such as a thunder or lightening storm, and the external network site from which notification is received is a site on the Internet. Still other and further aspects, advantages and embodiments of the present invention will become apparent by reference to the drawings and by reading the following description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
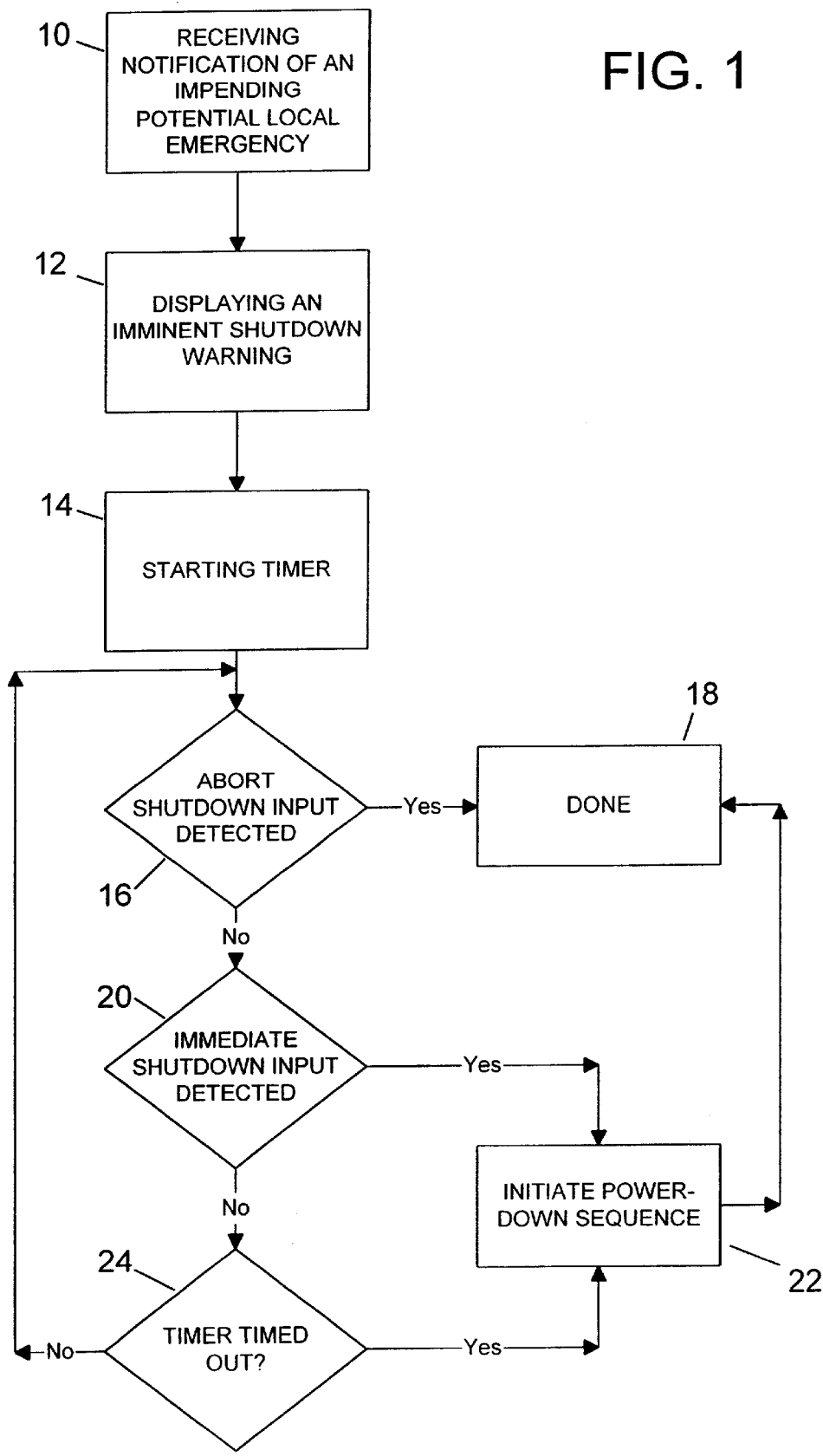
FIG. 1 is a flowchart of an emergency protection computer program according to one embodiment of the invention.

Referring first to FIG. 1, a flowchart of an emergency protection computer program according to one embodiment of the invention is shown. In step 10, the computer program receives notification of an impending potential local emergency from an external network site. In a preferred embodiment, the emergency is a weather emergency, such as a tornado or thunder or lightening storm. The emergency is impending in that it has not yet reached the locality at which the computer on which the computer program is running is situated. The emergency is potential in that it may or may not actually occur. For example, a severe thunderstorm may have been detected in a region near that where the computer is located, but this does not necessarily mean that the computer's locale will be affected, although there is a potential that it will. Finally, the emergency is local in that it may affect the area in which the computer is located. Other impending potential local emergencies contemplated by the invention are forest fires and earthquakes.

The external network site from which the computer program receives the notification is preferably a world-wide-web or other site on the Internet. The invention is not limited to a particular manner in which the external network site notifies the computer program. In one embodiment, the computer program periodically polls the external network site to receive the notification, whereas in another embodiment the site sends the program notification without polling. Several Internet web sites currently permit configuration so that the information a particular computer receives from a site is customized for that computer. As a related example, the Wall Street Journal web site, at http://wsj.com, and the Networth web site, at http://networth.galt.com, both permit the configuration of a customized portfolio of stocks and mutual funds, the prices for which are updated on a regular basis.

Preferably, an external network site permits similar customization for weather information. A computer according to the invention located in Sioux Falls, South Dakota, accesses periodically weather information regarding the Sioux Falls area. When the information includes one of several predetermined words, such as "severe" or "thunderstorm," etc.—or if the information includes a predetermined code corresponding to an impending local potential emergency—the program in step 10 interprets this information as having received a notification of an impending potential local emergency. (Alternatively, the Internet site itself sends the information to the user without the computer periodically accessing the site; i.e., the site is configured to automatically send the computer notification of an impending potential local emergency as such emergencies become known to the site.) There are many online news services that provide weather updates, such as http://www.weather.com, which is the Weather Channel's site.

Figure 2:
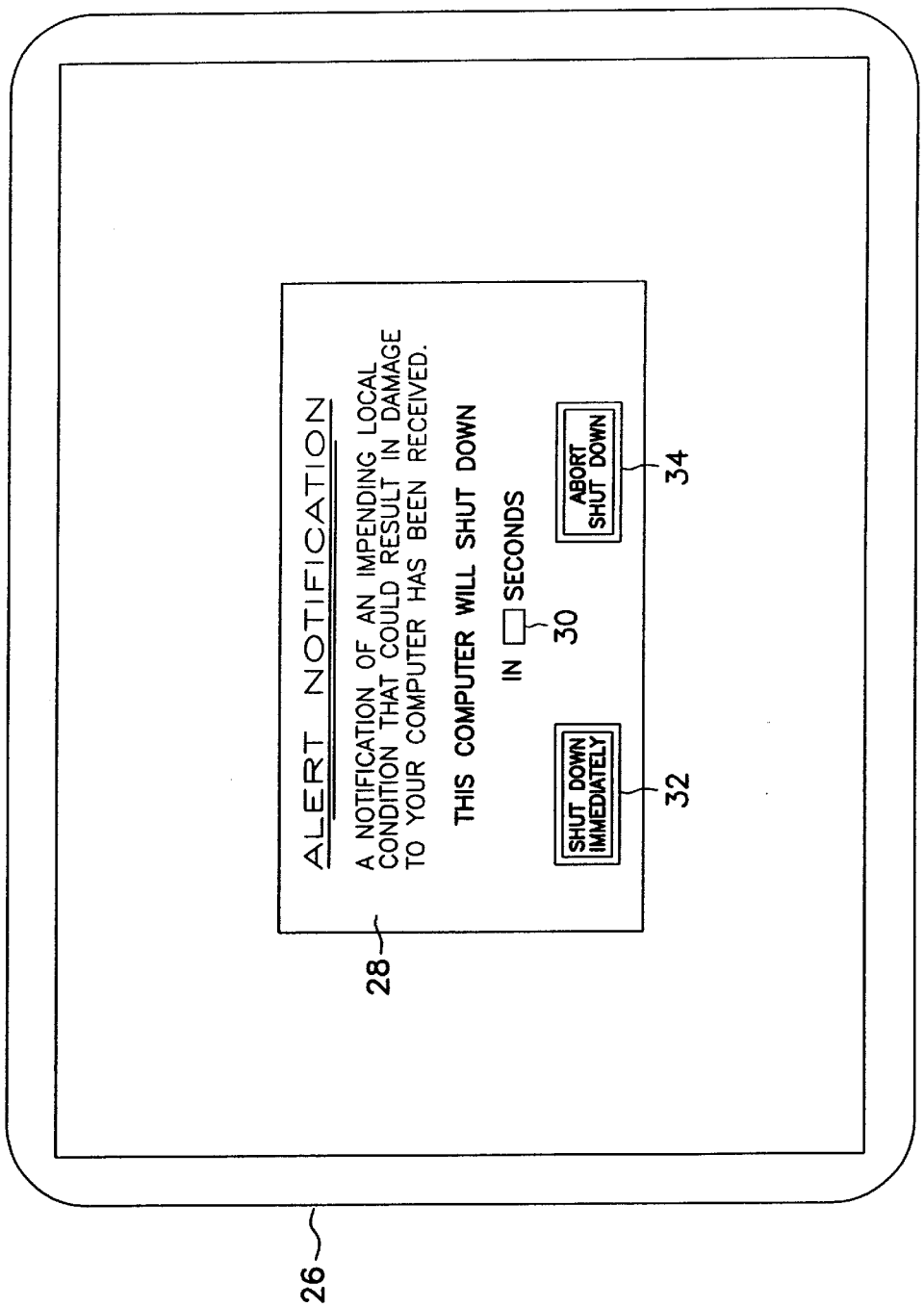
FIG. 2 is a diagram of a screen shot from the program of FIG. 1 in one embodiment; and, FIG. 3 is a block diagram of a computerized system according to one embodiment of the invention.

Once the program has received notification of an impending potential local emergency in step 10, the program displays an imminent shut down warning in step 12. Preferably this warning is displayed on a display device, such as a computer monitor having a cathode-ray tube (CRT), coupled to the computer. An exemplary warning as a diagram of a screen shot is shown in FIG. 2. Referring now to FIG. 2, screen 26 is the screen of the display device coupled to the computer on which the emergency protection program is running. The computer is preferably running an operating system having a graphical user interface, such as Microsoft Windows. Therefore, the warning on screen 26 is displayed as dialog box 28.

Dialog box 28 includes a textual warning notification to a user of the computer, as is shown in FIG. 2. Alternatively, an audio warning is provided to the user, such as a digitized voice message or audible beeps. Furthermore, dialog box 28 includes countdown-to-shut down timer display 30, which indicates to the user the amount of time that remains until the program will begin an emergency shut down sequence to protect the computer from damage. This amount of time is continually updated until the timer times out. That is, preferably the computer program of the invention does not immediately shut down the computer, but rather waits a predetermined amount of time (e.g., 60 seconds) before starting a shut down sequence. This amount of time is ample enough to permit the user to back up data manually (i.e., a controlled shut down), but short enough that the impending potential local emergency does not invade the area in which the computer is located.

Dialog box 28 also includes shut down immediately button 32, and abort shut down button 34. Shut down immediately button 32 is actuated preferably by a user moving a pointer on screen 26 controlled by a pointing device (e.g., a mouse) coupled to the computer over button 32, and clicking a mouse button on the mouse. Actuation of shut down immediately button 32 indicates the user's desire to shut down the computer system immediately, and not wait until the countdown-to-shut down timer has timed out. Likewise, abort shut down button 34 is also actuated preferably by a user moving the pointer over button 34, and clicking a mouse button. Actuation of abort shut down button 34 indicates the user's desire not to shut down the computer system at all. I.e., actuation of button 34 indicates that the user wishes to cancel the program.

Referring back to FIG. 1, after the program has displayed the imminent shut down warning in step 12, it starts the countdown-to-shut down timer in step 14. As has been already described, the countdown-to-shut down timer counts down a predetermined amount of time. When the timer times out (i.e., the predetermined amount of time has elapsed), the program initiates the power-down sequence to shut down the computer. Preferably, this predetermined amount of time is 60 seconds, but is pre-configurable by the user.

Once the timer has been started in step 14, the program determines in step 16 if the abort-shut down input has been detected. As has been described above, preferably the abort-shut down input is the pressing of a mouse button after the pointer on the screen has been moved over an abort-shut down button in a warning dialog box. However, the invention is not so limited. Alternatively, a hot key on the keyboard is also programmable to act as the abort-shut down input, for example. If the abort-shut down input has been detected, the emergency protection program ends at step 18. That is, the abort-shut down input is indicative of the user's wish to not shut down the computer in light of the notification of an impending potential local emergency, and therefore the program is stopped.

If the abort-shut down input has not been detected, the program determines in step 20 if the immediate-shut down input has been detected. As has been described above, preferably the immediate-shut down input is the pressing of a mouse button after the pointer on the screen has been moved over a corresponding button in a warning dialog box. Again, the invention is not so limited, and, for example, a hot key on the keyboard is also alternatively programmable to act as the immediate-shut down input. The immediate-shut down input is indicative of the user's wish to immediately shut down the computer in light of the notification of an impending potential local emergency, and not wait until the timer has timed out to do so. If this input has been detected, the emergency protection program initiates a power-down sequence in step 22.

The invention is not limited to any specific manner in which a power-down sequence is initiated in step 22. In a preferred embodiment, the computer on which the emergency protection program is running is compatible with the Advanced Power Management (APM) specification provided by Microsoft Corp. and Intel Corp., revision 1.2, which is hereby incorporated by reference. As those skilled in the art understand, a computer having APM capability is able to shut itself off via a program asserting a software trigger (specifically, the set power state=off command) to signal the computer to turn itself off. Therefore, in the preferred embodiment, the power-down sequence includes the assertion of the set power state=off command of the APM. This effectively turns off the computer, and protects it from becoming damaged as a result of the impending potential local emergency of which notification has been received. In another embodiment, the sequence also includes an automatic back-up of current memory contents of the computer to a storage device. The emergency protection program ends at step 22 after this sequence has been completed.

If the immediate-shut down input has not been detected, the program determines in step 24 if the countdown-to-shut down timer has timed out. The timer timing out means that the predetermined amount of time the emergency protection program waits until it shuts down the computer has elapsed. The timer has counted down to zero. If the timer has timed out in step 24, then the emergency protection program initiates the power-down sequence in step 22, as has been described above. If the timer has not yet timed out in step 24, the emergency protection program reverts to step 16, and continues cycling through steps 16, 20 and 24 until the timer has timed out, or an abort-shut down or immediate-shut down input has been detected.

Figure 3:
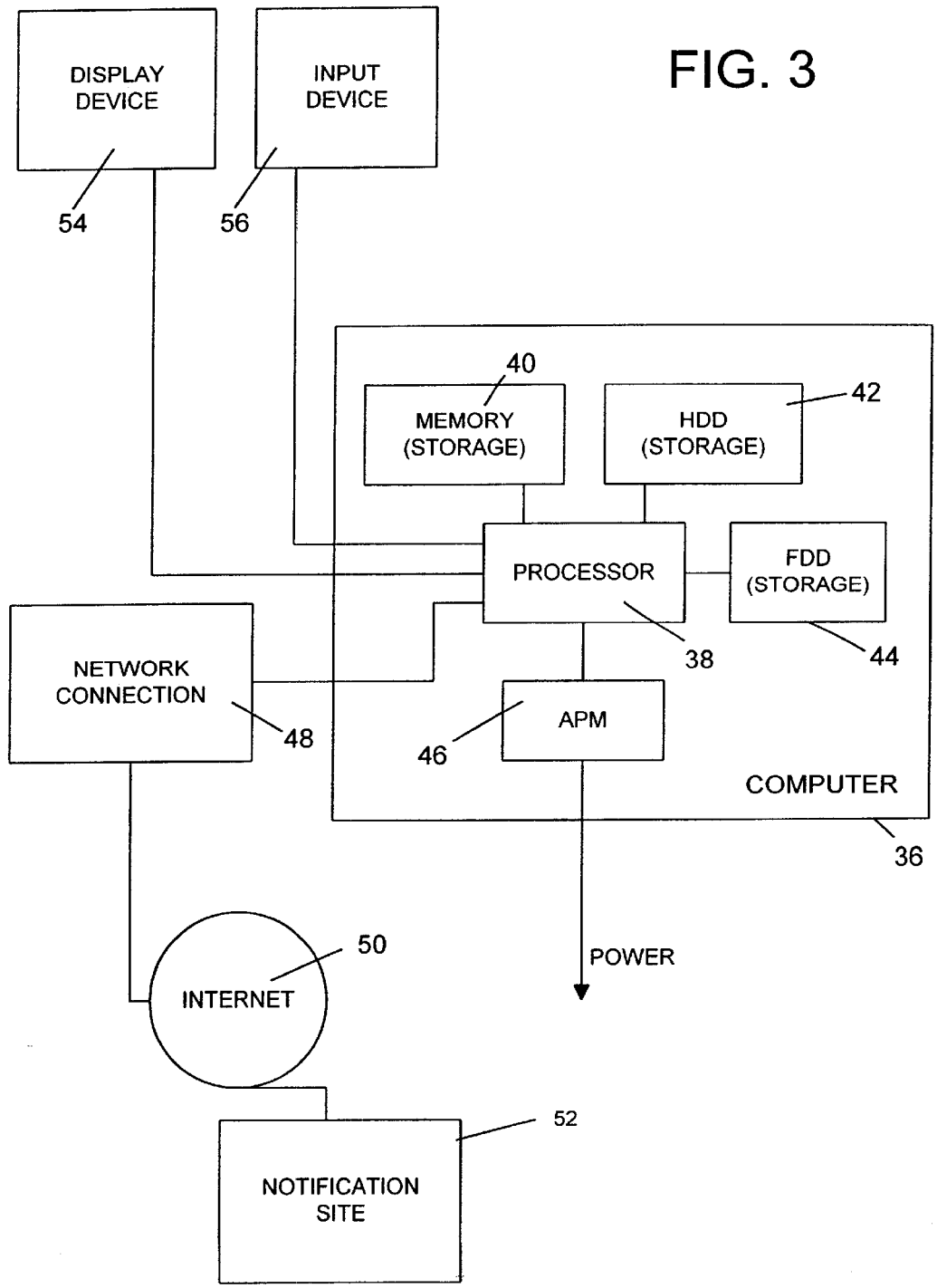

Referring now to FIG. 3, a block diagram of a computerized system according on one embodiment of the invention. The blocks within the block diagrams and the interconnections between and among the blocks represent logical constructs that may or may not have exact corresponding physical structures. For example, that processor 38 is shown as a block connected by a line to floppy disk drive device (FDD storage device) 44 means that processor 38 logically connects to FDD 44. That is, processor 38 can receive data from and send data to FDD 44, but processor 38 is not necessarily directly physically coupled to FDD 44. For further example, APM 46 is represented as a block diagram, and represents the hardware and/or software necessary to implement the Advanced Power Management specification as has been described on computer 36. APM 46 is not, however, a separate physically discrete entity within computer 36.

As shown in FIG. 3, computer 36 includes processor 38 logically (operatively) coupled to memory 40, hard disk drive (HDD) 42, floppy disk drive (FDD) 44, and Advanced Power Management (APM) 46. Processor 38 is any type of processor, although preferably an Intel Pentium processor. Memory 40 is one type of storage available to processor 38, and includes random-access memory (RAM) (preferably, at least sixteen megabytes) and read-only memory (ROM). HDD 42 and FDD 44 are other types of storage available to processor 38. The emergency protection program of the invention, a flowchart of one embodiment of which has been shown in and described in conjunction with FIG. 1, is preferably executed from a storage by processor 38, and is not separately shown in FIG. 3. As has been described, APM 46 represents the hardware and/or software that implements the Advanced Power Management specification, preferably revision 1.2. APM 46 is operatively coupled to the power source, such that upon reception of the set power state=off command from the emergency protection program, it shuts down (i.e., turns off) computer 36.

Processor 38 is operatively coupled to network connection 48. As shown network connection 48 is external to computer 36, but the invention is not limited to this architecture, and network connection 48 may be internal without departure from the scope of the invention. Network connection 48 permits computer 36 to access an external network, such as Internet 50, which is a distributed network only logically represented as a block within the block diagram of FIG. 3. Network connection 48 preferably is a T1 line or other high-speed connection to an external network (e.g., Internet 50). Alternatively, network connection is a modem for connection to a plain-old-telephone system (POTS) or an integrated services digital network (ISDN), in order to connect to Internet 50. Via network connection 48, computer 36 is able to connect to notification site 52 over Internet 50. As has been described above, site 52 is an external network site from which computer 36 receives notification of an impending potential local emergency. Preferably site 52 is an Internet site, such as a world-wideweb site. Network connection 48 is alternatively a wireless connection. Furthermore, network connection 48 alternatively receives notification from an emergency broadcast system or other external network, and not Internet 50.

In one embodiment of the invention, the emergency protection program of the invention is stored on computer-readable media. The invention is not limited to any particular embodiment, however. The media is in one embodiment a floppy disk insertable into the FDD. In another embodiment, the media is the HDD, onto which the emergency protection program is stored after being downloaded from an Internet web site, ftp host, or an electronic bulletin board system (BBS). In still another embodiment, the media is a read-only memory (ROM), which is part of the memory of the computer. In still yet another embodiment, the media is a cartridge insertable into a tape cartridge drive not shown in FIG. 3.

Incident to receiving notification from site 52, the emergency protection program, as executed by processor 38, turns off the computer by asserting a set power state=off command to APM 46. As has been shown in and described in conjunction with the flowchart of FIG. 1, in a preferred embodiment the program first displays a warning of the notification, and starts a countdown-to-shut down timer prior to shutting down the computer. As has also been shown in and described in conjunction with the flowchart of FIG. 1, the program preferably also detects an immediate-shut down input, detection of which causes immediate shut down without waiting for the timer to time out, and an abort-shut down input, detection of which causes the program to not shut down the computer.

Computer 36 is operatively coupled to display device 54 and input device 56. As shown in FIG. 3, display device 54 and input device 56 are external to computer 36, but the invention is not so limited. Display device 54 and input device 56 are alternatively internal to computer 36, without departure from the scope of the invention. Display device 54 is preferably a computer monitor housing a cathode-ray tube (CRT), and in the case of a laptop computer is a flat-panel display. Input device 56 is preferably a pointing device such as a mouse, and alternatively is a computer keyboard. The emergency protection program of the invention displays warning of the notification of the impending potential local emergency onto display device 54, and receives the immediate-shut down and abort-shut down inputs from input device 56, as has already been shown in and described in conjunction with FIG. 1.

As has been described, the present invention turns off a computer in response to the notification of an impending potential local emergency. In so doing, the invention provides for a number of advantages. Because the emergency is not yet happening (it is not a current emergency), the invention provides sufficient time to properly turn off the computer, by backing up necessary data, saving open files, and closing application programs, etc. That is, the invention provides for a controlled shut down of the computer in light of an impending potential local emergency. Thus, the invention overcomes shortcomings found in the prior art.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the following claims and equivalents thereof.

I claim:

1. A computer comprising:

a processor;

a storage operatively coupled to the processor;

an external network connection operatively coupled to the processor; and an emergency protection program executed from the storage by the processor to save critical data to a computer-readable medium and turn off the computer in response to receiving a notification of an impending potential local emergency from an external network site over the external network connection.

2. The computer of claim 1, wherein the impending potential local emergency comprises an impending potential local weather emergency.

3. The computer of claim 1, wherein the emergency protection program periodically polls the external network site over the external network connection to receive the notification of the impending potential local emergency.

4. The computer of claim 1, wherein the external network site sends the notification of the impending potential local emergency to the emergency protection program without polling from the emergency protection program.

5. The computer of claim 1, wherein the notification of an impending emergency includes receiving a predetermined code.

6. The computer of claim 1, wherein receiving the notification of an impending emergency includes scanning the external network site for a set of predetermined text.

7. The computer of claim 1, wherein the emergency protection program turns off the computer by triggering a set power state=off command of an advanced power management component installed on the computer.

8. The computer of claim 1, wherein the external network connection connects the computer to the Internet.

9. The computer of claim wherein the external network site is a world-wide-web site on the Internet.

10. A method for protecting a computer, comprising:

receiving a notification of an impending potential local emergency from an external network site over an external network;

saving critical data to a computer-readable medium;

turning off the computer upon failure to detect an abort-shut-down input.

11. The method of claim 10, wherein the impending potential local emergency comprises an impending potential local weather emergency.

12. The method of claim 10, wherein receiving a notification of an impending local emergency includes receiving a predetermined code representing the emergency.

13. The method of claim 10, wherein receiving a notification of an impending local emergency includes scanning the external network site for a predetermined set of text.

14. The method of claim 10, wherein turning off the computer includes triggering a set power state=off command of an advanced power management component installed on the computer.

15. The method of claim 10, wherein failure to detect an abort-shut-down includes receiving an immediate-shut-down input from an input device of the computer.

16. The method of claim 15 wherein the immediate-shut-down input comprises a hot-key.

17. The method of claim 15, wherein the immediate-shut-down input comprises a button selection.

18. The method of claim 10, wherein the external network comprises the Internet.

19. A computer-readable medium having computer executable instructions stored thereon to cause a suitably equipped computer to save critical data and execute a turn off process upon receiving notification of an impending potential local emergency from an external source operatively coupled to the computer.

20. The media of claim 19, wherein the impending potential local emergency comprises an impending potential local weather emergency.

21. The media of claim 19, wherein the external network comprises the Internet.

* * * * *